US012603930B2

(12) United States Patent
Nilsson et al.

(10) Patent No.: US 12,603,930 B2
(45) Date of Patent: Apr. 14, 2026

(54) CONTENT DELIVERY

(71) Applicant: BRITISH TELECOMMUNICATIONS PUBLIC LIMITED COMPANY, London (GB)

(72) Inventors: Michael Nilsson, London (GB); Timothy Stevens, London (GB); Stephen Appleby, London (GB); Rory Turnbull, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 105 days.

(21) Appl. No.: 18/553,110

(22) PCT Filed: Mar. 15, 2022

(86) PCT No.: PCT/EP2022/056705
§ 371 (c)(1),
(2) Date: Sep. 28, 2023

(87) PCT Pub. No.: WO2022/207310
PCT Pub. Date: Oct. 6, 2022

(65) Prior Publication Data
US 2024/0187466 A1 Jun. 6, 2024

(30) Foreign Application Priority Data
Mar. 30, 2021 (GB) ...................................... 2104529

(51) Int. Cl.
*H04L 65/611* (2022.01)
*H04L 65/612* (2022.01)
(52) U.S. Cl.
CPC .......... *H04L 65/611* (2022.05); *H04L 65/612* (2022.05)

(58) Field of Classification Search
None
See application file for complete search history.

(56) References Cited

U.S. PATENT DOCUMENTS 9,871,839 B2    1/2018   Kim et al.
10,484,441 B2   11/2019  Kotecha et al.
(Continued)

FOREIGN PATENT DOCUMENTS

WO    WO-2011022994 A1 *   3/2011   ............. H04L 65/80
WO         2015101782 A1   7/2015
(Continued)

OTHER PUBLICATIONS

International Search Report and Written Opinion of the ISA for PCT/EP2022/056705 mailed Jun. 7, 2022, 11 pages.
(Continued)

*Primary Examiner* — Schquita D Goodwin
*Assistant Examiner* — Ishrat Rashid
(74) *Attorney, Agent, or Firm* — Nixon & Vanderhye P.C.

(57) ABSTRACT

A method of managing content delivery to a client device by a proxy, where the content is made up of a sequence of segments. The proxy starts off by receiving content requests from the client device over unicast, and fulfilling those requests by forwarding them to a content server, and receiving that content before forwarding onto the client device. At some stage, the proxy determines that a multicast channel should be joined to more efficiently receive the required content. However, the multicast channel is likely to be ahead of the available unicast data. Therefore, a multicast join command is delayed until the proxy has taken steps to obtain subsequent content by unicast faster than that content is being requested by the client device, so that the obtained content has caught up with the content available on the multicast channel. The proxy stores this content and uses it (Continued)

Key

Content Production
Bi-directional unicast
Uni-directional multicast

102 Content Source
104 Content Encoder
106 Multicast Transmitter
108 Retransmission Server
110 Unicast Server
112 Proxy
114 Client Device to respond to requests from the client device. Only then does the proxy take action to join the multicast channel.

10 Claims, 4 Drawing Sheets

(56)                    References Cited

U.S. PATENT DOCUMENTS

| | | | |
|---|---|---|---|
| 2009/0052450 A1* | 2/2009 | Mockett | H04L 1/1809 |
| | | | 370/390 |
| 2010/0131995 A1* | 5/2010 | Guo | H04N 21/4325 |
| | | | 725/94 |
| 2014/0095668 A1* | 4/2014 | Oyman | H04W 28/16 |
| | | | 709/219 |
| 2014/0282777 A1 | 9/2014 | Gonder et al. | |
| 2015/0036526 A1* | 2/2015 | Mantin | H04L 65/80 |
| | | | 370/252 |
| 2017/0019439 A1 | 1/2017 | Kim et al. | |
| 2017/0251034 A1 | 8/2017 | Schmidt et al. | |
| 2018/0352305 A1* | 12/2018 | Bowen | H04L 65/70 |
| 2019/0190971 A1* | 6/2019 | Chen | H04L 65/70 |

FOREIGN PATENT DOCUMENTS

| | | |
|---|---|---|
| WO | 2017125150 A1 | 7/2017 |
| WO | 2020173878 A1 | 9/2020 |
| WO | 2021005756 A1 | 1/2021 |
| WO | 2021014591 A1 | 1/2021 |

OTHER PUBLICATIONS

Combined Search and Examination Report for GB Application No. 2104529.9 dated Sep. 16, 2021, 6 pages.
Examination Report for GB Application No. 2104529.9 dated Mar. 30, 2023, 4 pages.
Mi et al., "Demonstrating Immersive Media Delivery on 5G Broadcast and Multicast Testing Networks", IEEE Transactions on Broadcasting, Published Mar. 18, 2020 (16 pages).
Patents Act 1977: Search Report under Section 17 issued for GB Application No. GB21178777, dated May 13, 2022 (4 pages).
International Preliminary Report on Patentability for International Application No. PCT/EP2022/056705 dated Oct. 3, 2023 (9 pages).
International Search Report and Written Opinion of the International Searching Authority for International Application No. PCT/EP022/082927, dated Jan. 27, 2023 (13 pages).
International Preliminary Report on Patentability and Written Opinion of the International Searching Authority dated Jun. 20, 2024, issued for International Application No. PCT/EP2022/082927 (8 pages).
Communication pursuant to Article 94(3) EPC dated Mar. 19, 2025, issued for European Application No. 22 715 573.6-1206.

* cited by examiner

100

Key

102 Content Source
104 Content Encoder
106 Multicast Transmitter
108 Retransmission Server
110 Unicast Server
112 Proxy
114 Client Device ⟶ Content Production ⟵⟶ Bi-directional unicast

- - - - - - ⟶ Uni-directional multicast

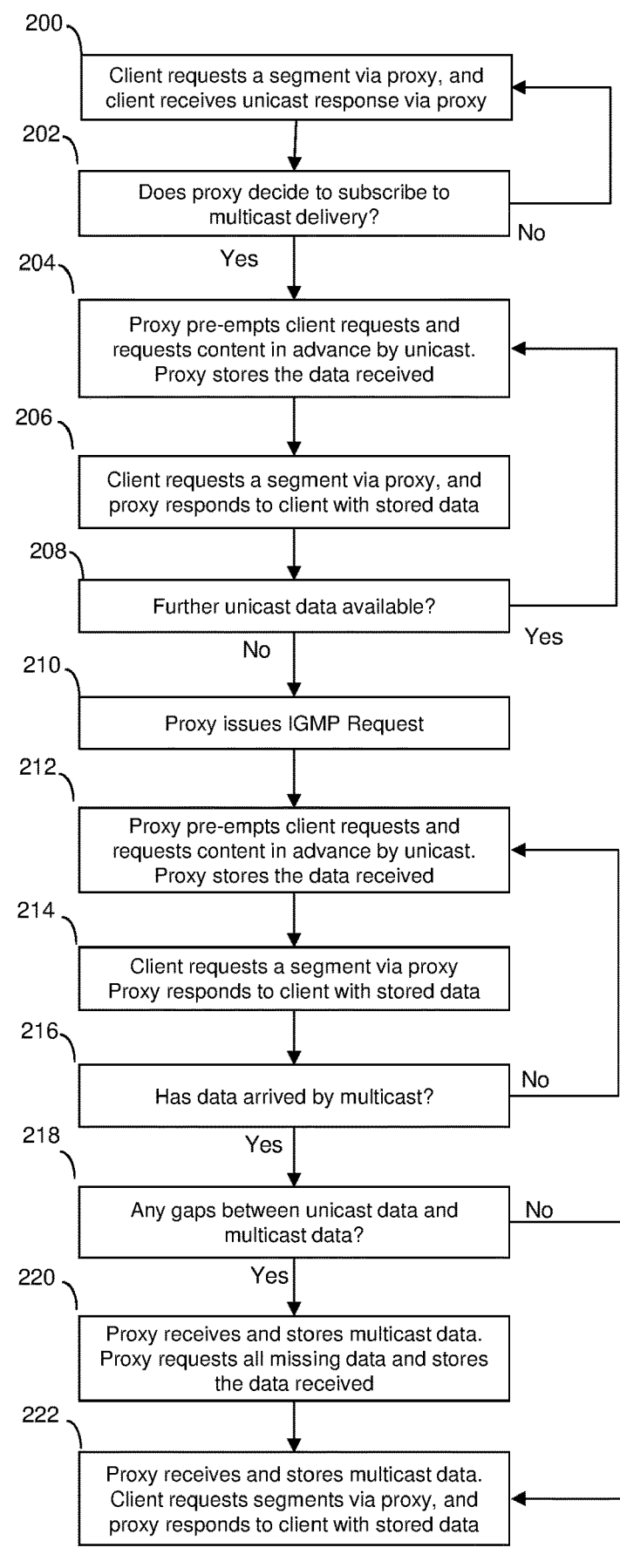

Client requests a segment via proxy, and client receives unicast response via proxy

202

Does proxy decide to subscribe to multicast delivery?

No

Yes

204

Proxy pre-empts client requests and requests content in advance by unicast. Proxy stores the data received

206

Client requests a segment via proxy, and proxy responds to client with stored data

208

Further unicast data available?

Yes

No

210

Proxy issues IGMP Request

212

Proxy pre-empts client requests and requests content in advance by unicast. Proxy stores the data received

214

Client requests a segment via proxy Proxy responds to client with stored data

216

Has data arrived by multicast?

No

Yes

218

Any gaps between unicast data and multicast data?

No

Yes

220

Proxy receives and stores multicast data. Proxy requests all missing data and stores the data received

222

Proxy receives and stores multicast data. Client requests segments via proxy, and proxy responds to client with stored data

CONTENT DELIVERY

CROSS-REFERENCE TO RELATED APPICATIONS

This application is the U.S. national phase of International Application No. PCT/EP2022/056705 filed Mar. 15, 2022 which designated the U.S. and claims priority to GB 2104529.9 filed Mar. 30, 2021, the entire contents of each of which are hereby incorporated by reference.

FIELD OF THE INVENTION

This invention relates to the field of managing content delivery in a network, in particular managing content delivery using a combination of unicast and multicast.

BACKGROUND TO THE INVENTION

Video content is currently commonly delivered to a range of client devices using unicast delivery, where a single stream of data is transmitted to each individual client device. Web (HTTP) technology is used for the content delivery, where the content is segmented into short segment files, typically around six to ten seconds in duration, enabling each segment file to be requested by and delivered to the client device using HTTP.

Each segment may also be encoded at a set of quality levels, each with a different bit rate and hence different file size. The client device monitors its buffer level and the network throughput achieved, and determines from these at which quality to request the next segment in order to achieve a good compromise between media quality and timely delivery. This is commonly referred to as adaptive bitrate (ABR) streaming.

However, HTTP is delivered over unicast (one to one) transport, so is inefficient for delivering the same content at the same time to many client devices. Multicast (one to many) transport would be far more efficient. Yet multicast is currently rarely used for any services other than network operators' on-net linear video channels delivered to their own set-top boxes. The main reason for this is that multicast does not lend itself to open use on the Internet.

To bring the benefits of multicast scalability to HTTP-based Internet media streaming, a class of techniques known as Multicast-Adaptive Bitrate (m-ABR) is being investigated and standardised.

Multicast-Adaptive Bitrate (m-ABR) is a relatively new technology. It aims to allow more efficient delivery of ABR content over networks by enabling the use of multicast for content streams where many clients are requesting the same content at about the same time. One ambition of many m-ABR systems is to deploy multicast and enable m-ABR without any change to the client device and the client application that are already supporting HTTP (unicast) streaming. This can be achieved using a hybrid approach that uses a combination of both multicast and unicast delivery, where a proxy is inserted between the client device and the content server. The proxy can inspect content requests from the client device, and when appropriate, subscribe to a multicast stream, receive multicast content, and provide this content to the client, packaged to look like unicast delivered content.

Examples of such hybrid solutions include: "IP Multicast Adaptive Bit Rate Architecture Technical Report" OC-TR-IP-MULTI-ARCH-C01-161026, 26/10/2016, by Cable Labs; 3GPP specifications, 23.246 (MBMS Architecture and functional description), 26.346 (MBMS Protocols and codecs) and 26.347 (MBMS APIs); and DVB "Adaptive Media Streaming over IP Multicast" ETSI TS 103 769 V1.1.1 (2020-11).

Problems can occur when switching between unicast and multicast in current hybrid solutions.

One issue is that the multicast channel will typically have a lower latency than the unicast channel, so content segments received over the multicast channel may be ahead of the content segments received over unicast channel. In such cases there will be missing segments between that received at the proxy in response to the unicast requests from the client device and the content segments received by the proxy on the multicast channel.

These missing segments must be obtained while continuing to receive the multicast channel. This simultaneous receiving of both multicast data and unicast data to fill the gap is problematic on connections that have low (insufficient) bandwidth. The multicast channel, which has no implementation of congestion control or any other way of reducing its transmission rate, will use the amount of bandwidth it needs regardless of the presence of any unicast transmissions.

Therefore on a low bandwidth connection, the transmission rate of the unicast data to fill the gaps between data previously received by unicast and the data received on the multicast channel will be at a reduced rate, and hence the resulting segments may not be received by the client device in time for continuous play-out of the content, and play-out may stall.

This slow or delayed delivery of content to the client device, which is behaving as a normal ABR streaming device, may cause it to change the quality level of the segments being requested, as the slow delivery of content segments would be seen as indicative of a slow network connection. This then in turn makes the data being received at the proxy over multicast unsuitable (it is at the wrong quality level) to satisfy the new requests made by the client device, which may cause the proxy to leave the multicast channel and return to satisfying the requests from the client device by obtaining the data by unicast.

Some solutions currently available prevent the client device from adapting to a different quality level by signalling that the content is only available at a single bit rate. However, this gives a poor user experience with interruptions to the presentation of content at the client device when the network throughput is insufficient for this single encoded quality level. Such interruptions may case the presentation of content to stall and/or some content not being presented at all.

Other solutions just assume that there is much more bandwidth available for the delivery of content to the client device than that needed for a single encoded stream. Hence there would be no problem with the simultaneous delivery of content by unicast and multicast during the transition period, which in practice is not always the case.

SUMMARY OF THE INVENTION

It is the aim of examples of the present invention to provide an improved content delivery mechanism that addresses one or more of the above problems.

According to one example of the invention, there is provided a method of managing content delivery over a network to a client device by a network element, said content comprising a sequence of segments, said method comprising:

receiving requests for segments from a client device, and
transmitting the requested segments to the client device
by unicast, wherein the transmitted segments are
obtained by the network element by:
i) requesting one or more of the requested segments from
a unicast content source until a decision is made to join
a multicast channel;
ii) requesting further segments from a unicast content
source before the corresponding requests for the further
segments are received from the client device, and
storing the further segments until requested by the
client device; and
iii) joining a multicast channel and receiving segments
over multicast, and storing the segments until requested
by the client device.

Requesting further segments from the unicast content
source may be done until no further segments are available
from the unicast content source. If there are any missing
segments between the further segments received over uni-
cast and the segments received over multicast, then those
missing segments can be requested from the unicast content
source over unicast by the network element.

The network element may be a proxy server. The unicast
content source may be a retransmission server.

According to a further example of the invention, there is
provided a network element for managing content delivery
to a client device, said content comprising a sequence of
segments, said network element adapted in operation to:
receive requests for segments from a client device, and
transmit the requested segments to the client device by
unicast, wherein the network element is further adapted
in operation to obtain the transmitted segments by:
i) requesting one or more of the requested segments from
a unicast content source until a decision is made to join
a multicast channel;
ii) requesting further segments from a unicast content
source before the corresponding requests for the further
segments are received from the client device, and
storing the further segments until requested by the
client device; and
iii) joining a multicast channel and receiving segments
over multicast, and storing the segments until requested
by the client device.

BRIEF DESCRIPTION OF THE DRAWINGS

For a better understanding of the present invention refer-
ence will now be made by way of example only to the
accompanying drawings, in which:

FIG. 2 is a flow chart summarising the steps of an example
of the invention;

DESCRIPTION OF PREFERRED
EMBODIMENTS

The present invention is described herein with reference
to particular examples. The invention is not, however, lim-
ited to such examples.

Examples of the present invention provide a method of
managing content delivery to a client device by a proxy,
where the content is made up of a sequence of segments. The proxy starts off by receiving content requests from the client
device over unicast, and fulfilling those requests by forward-
ing them to a content server, and receiving that content
before forwarding onto the client device. At some stage, the
proxy determines that a multicast channel should be joined
to more efficiently receive the required content. However,
the multicast channel is likely to be ahead of the available
unicast data. Therefore, a multicast join command is delayed
until the proxy has taken steps to obtain subsequent content
by unicast faster than that content is being requested by the
client device, so that the obtained content has caught up with
the content available on the multicast channel. The proxy
stores this content and uses it to respond to requests from the
client device. Only then does the proxy take action to join
the multicast channel, such as by issuing an IGMP join
request.

Figure 1:
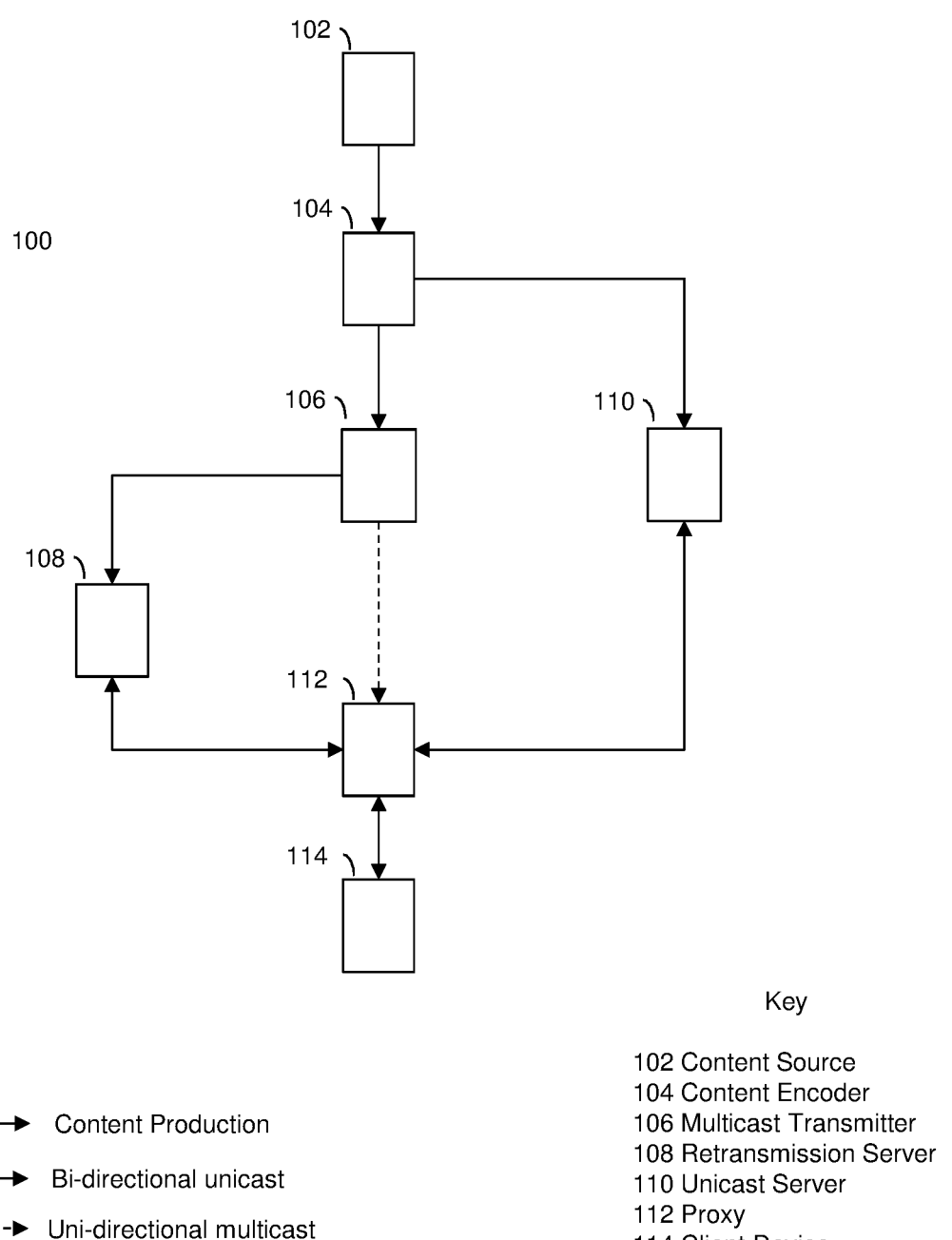
FIG. 1 system diagram showing the main components of
an example of the present invention.

FIG. 1 shows an adaptive bit rate (ABR) streaming system
100 comprising the main components of an example of the
invention. The system 100 comprises a content source 102,
a content encoder 104, a multicast transmitter 106, a retrans-
mission server 108, a unicast content server 110, a proxy 112
and a client device 114. The content source 102 provides
content, such as a live sports or TV broadcast, in the form
of video sequences to the content encoder 104.

The proxy 112 may be located within a device such as a
home gateway or router.

The client device 114 is assumed to be running a client
application, which is the source of content requests. For
simplicity, the term client device has been used to refer to a
client device running a client application.

The content encoder 104 receives the content from the
content source 102 and encodes it using a suitable compres-
sion scheme, such as ITU-T Recommendation H.264 for
video content, and segments the encoded content into a
sequence of content segments, each content segment typi-
cally of duration 2 to 10 seconds. The content encoder 104
also encodes the content at one or more quality levels or bit
rates, resulting in one or more (at each quality level)
encoded segments corresponding to each uncompressed
content segment. Such an arrangement is typical of an
adaptive bit rate streaming service.

The content segments encoded at one quality level, cor-
responding to one encoded bit rate, are passed to the
multicast transmitter 106 for transmission by multicast to
any devices that have subscribed to the respective multicast
source. However, the invention is not limited to this case,
and also applies when content segments encoded at a
plurality of quality settings, corresponding to a plurality of
encoded bit rates, are passed to the multicast transmitter 106
for transmission by multicast on a plurality of multicast
channels (one channel per quality setting).

The multicast transmitter 106 transmits the stream of
encoded content segments on a suitably configured multicast
channel to all devices that have subscribed to that multicast
channel. The multicast transmitter 106 also sends the content
segments to the retransmission server 108 where they are
stored. Unlike unicast transmission, which usually makes
use of a reliable transport protocol such as TCP or QUIC,
multicast transmission usually makes use of an unreliable
transport protocol such as UDP. Consequently, the system
100 includes a retransmission server 108, which enables
receivers that are receiving content by multicast to request
and receive content that was not successfully delivered by
multicast over the unreliable transport protocol.

Content segments are made available on the retransmis-
sion server 108 as soon as they have been transmitted over
multicast by the multicast transmitter 106. Receivers of the multicast data can request any missing content segments that were not successfully delivered by multicast from the retransmission server 108. Receivers can make unicast requests for missing content segments directed at the retransmission server 108, which responds over unicast with the missing segments using the stored data.

The content encoder 104 passes the encoded content segment data, encoded at all of the required bit rates, to the unicast server 110 where the data is stored and made available for delivery by unicast. The unicast server 110 responds to unicast requests for content segments with unicast responses using the stored data.

The client device 114 can obtain a manifest file from the unicast server 110. Manifest files are used by client devices to identify where segments are located (by a URL in the manifest). The client device 114 can then request these segments in sequence using HTTP requests from the unicast server 110, and concatenate them to form a continuous stream of segments for playback. As each segment is available on the unicast server 110 at a plurality of encoded bit rates, the client device 114 determines for each content segment, the encoded bit rate (quality) at which to request it, taking into account such factors as the available network throughput and how much data is already received and buffered at the client device 114 awaiting play-out.

Some HTTP requests made by the client device 114 for content will not make use of multicast delivery and are sent directly to the unicast server 110, which delivers the requested content by unicast. Other requests for content from the client device 114 that may benefit from multicast delivery are re-directed to, or simply intercepted by, the proxy 112, and can be handled in accordance with the examples described below.

The proxy 112 can be inserted in the HTTP path using any of a number of well-known techniques, such as using an HTTP redirection from the unicast server 110. In this case, the unicast server 110 would be configured such that requests for potentially popular content are not served directly but instead redirected to a suitable proxy. For example, instead of supplying a normal response, the unicast server 110 could respond with an HTTP status code 307 which indicates a temporary redirect. This invites the client device 114 to make a new request to the new URL supplied by the unicast server 110 in its response, thus enabling requests to be made to the proxy 112. This technique allows the unicast server 110 and the proxy 112 to exist in different domains, which would often be the case.

Other mechanisms to insert the proxy 112 in the HTTP path include: proxy configured as a transparent proxy (though all requests are intercepted by it, and only works with unencrypted traffic); proxy configured as a forward proxy (where the client device sends its requests directly to the proxy by virtue of being explicitly configured to do so); DNS hijacking (where a DNS server is configured to supply the IP address of the proxy for domains of interest); and manifest manipulation (where the manifest file is re-written so that requests are made directly to the proxy).

The client device 114 could request and receive segments from the unicast server 110 from the start to the end of a streaming session. However, in some cases the proxy 112 determines that multicast delivery could be used to receive some segments.

The proxy 112 monitors unicast content requests from the client device 114 and is aware of when content requested by the client device 114 could be received by multicast.

The proxy 112 determines when it is possible to satisfy the client device's requests for content using data that could be delivered by multicast, joins the relevant multicast channel at an appropriate time, and, after receiving data by multicast, replies to the client device's requests for unicast content with content received by multicast, but packaged as a unicast content response.

The client device 114 does not need to be aware of the proxy 112 and does not need to be aware of whether content is being delivered by unicast from the unicast content source via the proxy, or is delivered by multicast to the proxy which then delivers the content to the client device 114 in a unicast format.

There are many ways in which the proxy 112 may determine it is possible to satisfy the client device's requests for content using data that could be delivered by multicast.

For example, if client device 114 has made a plurality of consecutive requests for content segments at the same encoding quality level, that quality level is available by multicast delivery, and each of these content segments has been delivered in less time than the segment period.

In another example, the proxy 112 may ignore the fact that some segments have taken more time than a segment period to be delivered, provided that many segments are delivered in much less than a segment period. The proxy 112 may also ignore some variations in the quality at which segments are requested, if for much or all of the time there is easily sufficient network throughput to deliver content segments at the quality level available by multicast.

In typical systems, when the proxy 112 has decided to satisfy the client device's requests for content using data that could be delivered by multicast, the proxy 112 stops forwarding the client device's requests for content to the unicast server 110, and instead takes appropriate action to join and obtain from the multicast channel, the data requested by the client device 114. The proxy 112 then delivers that content received over multicast to the client device 114, with the data formatted as a unicast response.

However, such an approach can result in the problems identified earlier (missing data, and resulting problems in particular in low bandwidth systems, etc). Described now are examples of how content can be delivered in an improved manner.

In a first solution, the proxy 112 determines that a multicast channel should be joined as described above. However, instead of issuing a command to join (such by an IGMP join request) the multicast channel immediately, the proxy 112 delays taking that action.

Instead, the proxy 112 takes steps to obtain data by unicast faster than that data is being requested by the client device 114, until the obtained data has caught up with the data available on the multicast channel. In other words, the data that the proxy 112 is obtaining by unicast has only just been delivered on the multicast channel, and no further data is available by unicast. The proxy 112 stores this data and responds to client requests using this data.

To obtain data faster than requested by the client device 114, the proxy 112 predicts the next data that the client device 114 is likely to request. The prediction can be done by examining the manifest file used by the client device 114, as segments are requested sequentially and the URLs of each segment typically follow a predictable pattern. The proxy 112 may try to obtain this data by making a request to the unicast content server 110. However, the unicast server 110 may not have sufficiently recent data to satisfy the proxy's requirement (of catching up with the multicast data), so the proxy 112 may obtain this data by making requests to the retransmission server 108, as if the proxy 112 were already subscribed to the multicast channel and had failed to receive some multicast data.

The proxy 112 can then take action to join the multicast channel, such as by issuing an IGMP join request. The proxy 112 can then continue to request content by unicast from the retransmission server 108 until the time at which multicast data starts to be received, storing the received data. In this case there may be no or only a small amount of missing data for the proxy 112 to request by unicast, and the probability of the client device 114 not receiving data in time for decoding and presentation is greatly reduced. Indeed, in the majority of cases, if not all cases, no interruption of content play-out would occur, and the client device 114 would observe no significant change in network throughput and therefore would continue to request content at the same quality level, which the proxy 112 can supply having received it on the multicast channel and stored it until requested by the client device 114.

Note, in the above solution, the proxy 112 is obtaining data by unicast in advance of the requests for that data is being received from the client device 114. Thus, whilst the proxy 112 is making requests for data in advance, the proxy 112 will still be receiving requests for data from the client device 114, which the proxy 112 can respond to using the data already received and stored.

In an alternative solution, the approach above may be taken but the proxy 112 may stop trying to obtain data faster than requests are being received from the client device 114 after the IGMP join request has been issued. Instead, the proxy 112 simply waits until data is received on the multicast channel. In this case there may still be missing data between that received by unicast and the first data received on the multicast channel, but the amount of such missing data may be much less than had the proxy 112 not delayed the action of joining the multicast channel. The proxy 112 can request any missing data by unicast from the retransmission server, and may be able to do so in a timely fashion, especially if only a small time elapsed between requesting to join the multicast channel and multicast data being received.

FIG. 2 shows a flow chart summarising the first solution.

Starting at step 200, the client device 114 makes requests for segments of content stored at the unicast server 110. The proxy 112 intercepts these requests, and forwards the requests to the unicast server 110. The proxy 112 receives the requested segments by unicast from the unicast server 110, and forwards this data to the client device 114 as unicast responses to the requests from the client device 114. The client device 114 receives these segments, which can then be played out.

The client device 114 can request segments using HTTP GET requests, which are unicast in nature, directed to segments of content encoded at a particular bit rate. This initial or first bit rate may be chosen to be the lowest bit rate available, or the bit rate could be chosen in some other way, such as based on historical data or user preference. Each HTTP GET request includes the URL of where that segment can be retrieved from. The URLs are found in the manifest file associated with the content.

In step 202, the proxy 112 decides whether to subscribe to multicast delivery. This decision can be made dependent on many factors including whether the client device 114 has been requesting content that is available by multicast, whether the quality level of segments requested by the client device 114 are being delivered by multicast, whether the client device 114 has been requesting only segments at this quality level for some time, and whether the proxy 112 considers there to be sufficient bandwidth to the client device 114 to maintain timely delivery of segment data at this quality level.

If the proxy 112 decides to subscribe to multicast delivery, flow passes to step 204, otherwise flow passes back to step 200 and the proxy 112 continues to receive and respond as before to unicast requests from the client device 114.

In step 204, the proxy 112 pre-empts unicast requests from the client and requests content by unicast before it has been requested by the client device 114. If the proxy 112 can predict the sequence of URLs that the client device 114 will request and if the proxy 112 satisfies all necessary security considerations to be supplied content from the unicast content server 110, the proxy 112 could request content from the unicast content server 110. However, it is more likely in general that one or both these requirements are not met, in which case the proxy 112 could request content from the retransmission server 108. The proxy 112 stores the data received in response to the unicast content requests.

In step 206, the client device 114 makes requests for segments of content stored at the unicast server 110. The proxy 112 intercepts these requests and responds to the client device 114 with unicast responses including data that had already been requested, received, and stored from step 204. The client device 114 receives these segments, which can then be played out.

In step 208, the proxy 112 determines whether any more data could be pre-emptively requested by unicast. The proxy 112 could, for example, issue a request for more content and in the event of receiving an error response, such as an HTTP error code 404, conclude that no more data is available. This is an indication that the proxy 112 has already obtained most or all of the data recently made available on the multicast channel. If the proxy 112 determines that there is more data available, flow passes back to step 204 where that data is requested. Otherwise flow passes to step 210.

In step 210, the proxy 112 initiates the process of joining the multicast channel. This may be done for example by issuing an IGMP Join request.

In step 212, the proxy 112 again pre-empts unicast requests from the client and requests content by unicast before it has been requested by the client device 114. Some of these requests may fail because there is no data available as the proxy 112 has already obtained most or all of the data recently delivered over the multicast channel, but some may succeed, in which case the proxy 112 stores the data received in response to the unicast content requests.

In step 214, as previously in step 206, the client device 114 makes requests for segments of content stored at the unicast server 110. The proxy 112 again intercepts these requests and responds to the client device 114 with unicast responses including data that had been requested, received, and stored on steps 204 or 212. The received segments can then be played-out by the client device 114.

In step 216, the proxy 112 determines whether it has received any data on the multicast channel that has been subscribed to from step 210. If no data has been received, flow passes to step 212, and the proxy 112 continues to make pre-emptive requests for content. Otherwise flow passes to step 218.

In step 218, the proxy 112 determines whether there is any data missing between the data it has received in steps 200, 204 and 212 and the data that has been received on the multicast channel. If there is no missing data, flow passes to step 222, otherwise flow passes to step 220.

In step 220, the proxy 112 receives data on the multicast channel and stores that data. The proxy 112 pre-empts unicast requests from the client and requests content by unicast before it has been requested by the client device 114. Specifically, the proxy 112 requests the data that has been identified as being missing data in step 118. The proxy 112 stores the data received in response to the unicast content requests.

In step 222, the proxy 112 receives data on the multicast channel and stores that data. The client device 114 makes requests for segments of content stored at the unicast server 110. The proxy 112 intercepts these requests and responds to the client device 114 with unicast responses including data that had been received and stored in earlier steps. This data may have been received at the proxy 112 by unicast delivery or by multicast delivery on the multicast channel. The segments are received by the client device 114, and can then be played-out.

As described earlier before the description of FIG. 2, there is an alternative solution where the proxy 112 stops requesting data by unicast once a multicast join request is made. In such a solution, the flow chart steps of FIG. 2 would differ slightly in that steps 212 and 214 would not be needed, and instead the proxy 112 would rely on step 220 to rectify any data missing between that received over unicast and the start of the multicast.

There now follows two worked examples to further illustrate the main solution. Specifically, the first example shows an approach that suffers from the problems identified earlier, and the second example shows the main solution (as summarised in FIG. 2).

The following system model is used in all the examples.

The client device is a standard ABR client that requests content segments periodically at intervals equal to the segment period. Content requests from the client device are intercepted by a proxy that has a high bandwidth connection to the client device. The proxy obtains the data requested by the client device either by forwarding the client request and receiving the data by unicast, or by joining a multicast stream and receiving the data by multicast. The data received by multicast may be received before being requested by the client, in which case it is buffered at the proxy. Regardless of how the proxy received the data, the response to the client device is formatted as a unicast response to the client's request: the client device is unaware of the proxy and unaware of how the data was delivered to the proxy. The multicast stream may suffer network impairments which result in packet loss, so a retransmission server is available to supply missing multicast content. The proxy makes requests to the retransmission server when receiving the multicast stream and it has suffered data loss, and also makes requests to the retransmission server when initially joining the multicast stream to obtain any data between the most recent data received by unicast and the first data received on the multicast stream. The system model thus resembles that of FIG. 1.

The following assumptions are also made in the examples.

The content is split into segments of fixed duration and encoded at multiple quality levels. Although in reality client devices may start at a lower level of quality, determine the available network throughput and then progress to a higher quality, in these examples, the client device is assumed to have already reached the state of requesting segments at a stable quality, equal to the quality that is available by multicast. The encoded rate for this quality is 10 Mbit/s. The client device is assumed to have a fixed bit rate connection to the content server at a bit rate of 15 Mbit/s, comprised of a high-speed connection to the proxy and a connection at 15 Mbit/s from the proxy to the content server.

It should be noted that this 15 Mbit/s bandwidth is insufficient to receive simultaneously the multicast at 10 Mbit/s and a content segment by unicast within a segment period, which would require an additional 10 Mbit/s. If a segment is not delivered within a segment period, content may not be delivered in time and hence play-out may stall. Also, the client device, which is unaware of the proxy and its possible use of multicast, may interpret a segment taking more than a segment period to be delivered as a sign of network congestion and switch to requesting a lower quality of content from the ABR hierarchy.

The data of a segment is delivered by multicast as it is being generated by the encoding process. In these examples, multicast delivery is at the encoded bit rate, that is, at 10 Mbit/s. After the segment has been fully delivered by multicast it is made available for unicast delivery. The client device requests a segment a fixed time after the segment is first made available. In these examples, the client requests each content segment 1.5 segment periods after the transmission of the segment starts on the multicast, which is equal to 0.5 segment periods after the transmission of the segment ends on the multicast. The client device starts to play-out the first segment 1.5 segment periods after requesting it, that is, 3.0 segment periods after the segment started to be transmitted by multicast.

In these examples, the proxy determines to use multicast delivery after delivery of segment 3 by unicast has finished. The proxy issues a command to join the multicast stream, and after a period of time, equal to 0.5 segment periods in these examples, multicast data starts to be received at the proxy.

The units of time used in the examples is the segment period, which may in 2 s, 6 s, 10 s, or any other value.

Figure 3:
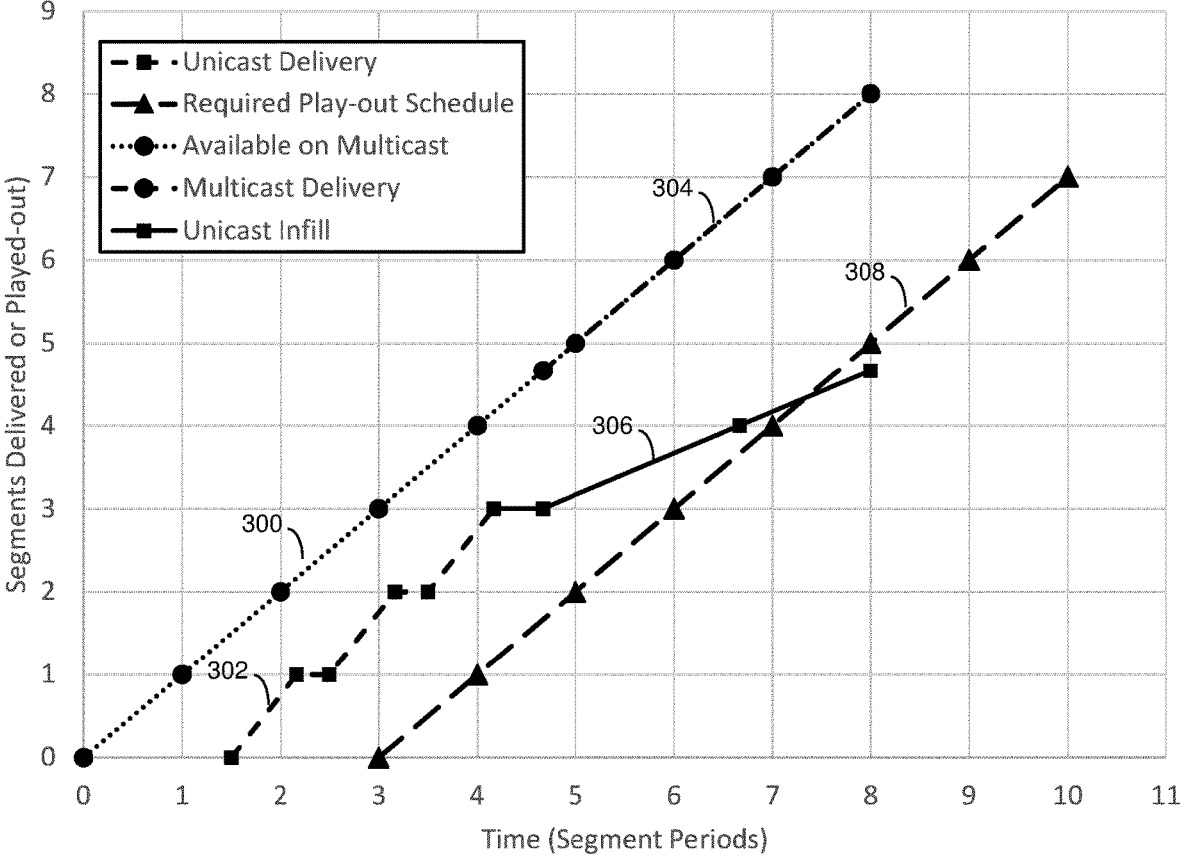
FIG. 3 is an example timing diagram illustrating content
delivery and playout.

Turning now to the first example, which illustrates a problematic approach with reference to the timing diagram in FIG. 3.

The example starts at time zero, when delivery of segment 1 by multicast is made available. Multicast is not received by the example client device at this point, but may be received by other client devices from this point. At time 1, delivery of segment 1 by multicast finishes, and delivery of segment 2 starts, and so on. This is shown by the dotted line 300 with circular data points.

The client device makes a request for segment 1 at time 1.5 by unicast. As the segment is encoded at 10 Mbit/s, and the fixed bit rate available from the content server to the client is 15 Mbit/s, it takes $10/15=0.67$ segment periods for the content to be delivered to the client device, and hence is delivered by time $1.50+0.67=2.17$. This is shown by the dashed line 302 with square data points.

As is typical in ABR streaming in the steady state, the client device does not make a request for the next segment immediately, but waits until one segment period after the previous request before making the next request. The client device therefore requests segment 2 at time 2.5 by unicast. Similar to segment 1, this takes 0.67 to be delivered and is delivered by time $2.50+0.67=3.17$. The client device again waits, this time until time 3.5, at which it requests segment 3, which again arrives 0.67 later at time $3.50+0.67=4.17$. At this time the proxy determines to use multicast delivery. The client device is unaware of this and will continue to request segments by unicast. In this example, the proxy is assumed to be close to the client and have bandwidth to the client significantly greater than the encoded rate of the content.

In this example the proxy issues a command to join the multicast as soon as segment 3 has been received, that is, at time 4.17. The client device requests segment 4 at time 4.5, unaware of the proxy and its command to join the multicast. The proxy intercepts this request and waits for multicast data to arrive. This data starts to arrive 0.5 after issuing the join command, that is at time 4.17+0.50=4.67. But the first data that arrives by multicast is from segment 5 (see dashed line 304 with circular data points), being the data that is 67% of the way through segment 5. The proxy therefore does not have any data for segment 4 which has been requested by the client device and has also missed the first 67% of segment 5. However the proxy does buffer the multicast data as it is received, in the expectation that it would be requested by the client device in the near future.

Hence the proxy must obtain segment 4 and the first 67% of segment 5 by unicast. This data, which we call unicast infill, could be requested from the same content server that the client device gets its unicast content from, if the proxy meets the security requirements to do so. This will often not be the case. Also, there may a delay between when data is multicast and when it is available from this server for unicast delivery: in this example a segment is not available to request until it has been fully delivered by multicast. But the retransmission server that is used to provide data that is lost during multicast transmission could be used to obtain the missing data.

But as multicast data is now being received at the proxy at 10 Mbit/s, only 15−10=5 Mbit/s of throughput is available for this unicast reception of the missing data.

It therefore takes the proxy server 10/5=2 segment periods to obtain segment 4 by unicast infill (as shown by the solid line 306 with square data points), which completes at time 4.67+2.00=6.67. Segment 4 is scheduled for play-out between time 6 and time 7, as shown by the dashed line 308 with triangular data points, which represents the required play-out schedule. Play-out would not stall if data could be passed to the client device as it is being received and the client device could decode and present data as it is being received, without having to await the arrival of the whole segment. But the client device requested this segment 4 at time 4.5, so even if the data could be transferred from the proxy to the client at high speed, the client would observe a delivery time of 6.67−4.50=2.17 segment periods, which may cause it to adapt to a lower quality of encoding from the ABR ladder.

The proxy still needs to get the first 67% of segment 5 by unicast. This takes a further time of 0.67*(10/5)=1.33 segment periods, completing at time 6.67+1.33=8.00. Although the remainder of this segment had been received by multicast and buffered at the proxy some time earlier, the client is scheduled to have played-out of segment 5 between time 7 and time 8, and hence play-out would stall as all of the data required for play-out was not delivered in time. This is illustrated in the timing diagram by the solid line 304 representing the unicast infill schedule going to the right of the required play-out schedule 306. The data 67% through segment 5 is not delivered to the proxy until time 8.00 while it was required for play-out at the client at time 7.67.

In addition, as the proxy does not have all of the data for segment 5 until time 8.00, and the client device requested this segment at time 5.50, the client device would observe a segment delivery time of 8.00−5.50=2.50 segment periods, which may cause the client to switch to a lower encoded bit rate. And by occurring immediately after another segment that took 2.17 segment periods to be delivered, the client device is even more likely to decide to make such as switch to a lower encoded bit rate, and hence make the data being received at the proxy by multicast unsuitable to satisfy the client device's subsequent content requests.

Figure 4:
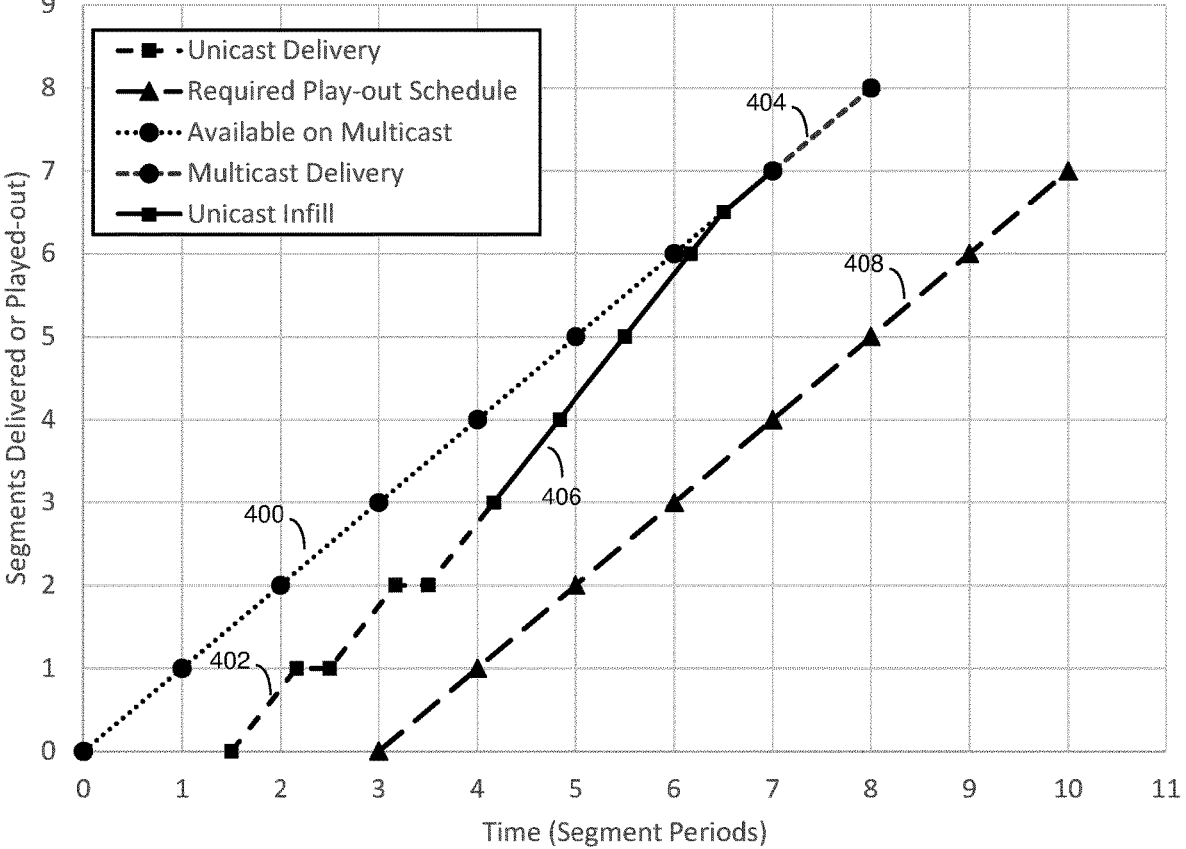
FIG. 4 is a timing diagram illustrating content delivery
and playout for an example of the invention.

Turning now to the second example, which illustrates the solution described in FIG. 2, with reference to the timing diagram of FIG. 4.

The behaviour of the client device and the timing of the receipt of data is the same as in the two examples described above until at time 4.17 when all of the data for segment 3 has been received by unicast and the proxy determines multicast delivery should be used. But rather than issuing a command to join the multicast immediately at time 4.17, the proxy delays issuing that command.

The proxy assumes that when it does eventually issue a command to join the multicast and data starts to be received by multicast that there will be missing data, being the data that immediately follows the data that has already been received by unicast. To negate this problem, the proxy immediately requests this data from the retransmission server over unicast.

The aim of the proxy is to catch-up with the multicast stream of data before issuing the command to join the multicast. This is possible as the speed of the connection from the proxy to the retransmission server is faster than the rate at which data is delivered in the multicast stream. By doing this, the proxy minimises the amount of data that must be retrieved from the retransmission server over unicast while simultaneously receiving multicast data, and hence minimises the amount of data that is delivered slowly from the retransmission server by unicast due to the multicast stream using a significant amount of the network bandwidth.

Segment 4 starts to be received by unicast (see unicast infill plot 406) from the retransmission server at the full network speed of 15 Mbit/s at time 4.17. The whole of segment 4 is delivered at 15 Mbit/s, and delivery finishes after 10/15=0.67 segment periods, at time 4.17+0.67=4.83.

While this has been happening, the proxy has received a request for segment 4 from the client device at time 4.5, and can respond to this request at time 4.83 over the high speed connection to the client device. The client device observes that this segment has been delivered in a time of 4.83−4.50=0.33 segment periods. The client is able to play out segment 4 on time without stalling, and has no reason to switch to a lower encoded bit rate. As this segment has been delivered to the proxy relatively early, the proxy may decide to slow or delay the delivery of it to the client device to maintain a consistent segment delivery time of 0.67 segment periods. Some client devices may consider large variation in delivery time of segments to be a signal of network variability and switch to a lower encoded bit rate as a precaution, even when all segments are delivered in much less than a segment period.

The proxy continues requesting data from the retransmission server over unicast. Segment 5 is also received in 0.67 of a segment period, arriving by time 4.83+0.67=5.50, coincidentally the precise time that the client device requests it. The proxy may choose to buffer segment 5 and deliver it to the client later to maintain a stable segment delivery time, or may choose to deliver it immediately that it has been requested. Similarly segment 6 is received in 0.67 of a segment period, arriving by time 5.50+0.67=6.17, well before it is requested by the client at time 6.50.

The first half of segment 7 is also delivered at 15 Mbit/s, taking a time of 0.50/(15/10)=0.33 segment periods until time 6.17+0.33=6.50. At this time there is no further data available at the retransmission server as the proxy has effectively caught-up with the multicast stream. It is at this point in time that the proxy issues a command to join the multicast.

While awaiting the arrival of the multicast data, which in these examples takes 0.50 of a segment period, the proxy may choose to continue to try to obtain data from the retransmission server. Some of these requests may fail if they are made too early, but some will succeed and by time 7.00 when multicast data starts to arrive at the proxy, it is possible that all of segment 7 has been delivered by unicast from the retransmission server.

The proxy continues to receive data by multicast, before it has been requested by the client device, and responds to the client device requests with the data received by multicast and buffered until requested by the client device.

Therefore, it can be seen that in this second example a multicast join request is delayed by the proxy whilst unicast requests are made for data before they are needed by the client device. This ensures that all the data that is required to satisfy the play-out schedule is obtained and delivered in time, thus solving the problem encountered in the first example. To contrast, note the unicast infill plot 406 never crosses to the right of the required play-out schedule plot 408, but instead meets the multicast delivery plot 404.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing content delivery to a client device by a network element, said content comprising a sequence of segments, said method comprising:
 receiving requests for segments from a client device, and transmitting the requested segments to the client device by unicast, wherein the transmitted segments are obtained by the network element by:
 i) requesting one or more of the requested segments from a unicast content source until a decision is made to join a multicast channel;
 ii) requesting further segments from a unicast content source before the corresponding requests for the further segments are received from the client device, and storing the further segments until requested by the client device;
 iii) joining a multicast channel and receiving segments over multicast, and storing the segments until requested by the client device; and
 delaying a multicast join command from being issued until the network element has obtained content by unicast faster than that content is being requested by the client device, so that the obtained content has caught up with the content available on the multicast channel.

2. A method according to claim 1, wherein requesting further segments from the unicast content source is done until no further segments are available from the unicast content source.

3. A method according to claim 1, wherein if there are any missing segments between the further segments received over unicast and the segments received over multicast, then requesting those missing segments from the unicast content source over unicast by the network element.

4. A method according to claim 1, wherein the unicast content source is a retransmission server.

5. A network element for managing content delivery to a client device, said content comprising a sequence of segments, said network element adapted in operation to:
 receive requests for segments from a client device, and transmit the requested segments to the client device by unicast, wherein the network element is further adapted in operation to obtain the transmitted segments by:
 i) requesting one or more of the requested segments from a unicast content source until a decision is made to join a multicast channel;
 ii) requesting further segments from a unicast content source before the corresponding requests for the further segments are received from the client device, and storing the further segments until requested by the client device; and
 iii) joining a multicast channel and receiving segments over multicast, and storing the segments until requested by the client device;
 wherein the network element is further adapted in operation to delay a multicast join command from being issued until the network element has obtained content by unicast faster than that content is being requested by the client device, so that the obtained content has caught up with the content available on the multicast channel.

6. The network element according to claim 5, wherein the requesting of the further segments from the unicast content source is done until no further segments are available from the unicast content source.

7. The network element according to claim 5, wherein the network element is further adapted in operation to: when there are any missing segments between the further segments received over unicast and the segments received over multicast, request those missing segments from the unicast content source over unicast by the network element.

8. The network element according to claim 5, wherein the unicast content source is a retransmission server.

9. The network element according to claim 5 wherein the network element is further adapted in operation to obtain the content by unicast faster than that content is being requested by the client device by predicting next data that the client device is likely to request.

10. The method according to claim 1 further comprising the network element obtaining the content by unicast faster than that content is being requested by the client device by predicting next data that the client device is likely to request.

* * * * *